(12) United States Patent
Wang et al.

(10) Patent No.: US 10,944,457 B2
(45) Date of Patent: Mar. 9, 2021

(54) MEASUREMENT METHOD, AND APPARATUS

(71) Applicant: HUAWEI TECHNOLOGIES CO., LTD., Guangdong (CN)

(72) Inventors: Ting Wang, Shanghai (CN); Jinyao Liang, Shenzhen (CN); Yuanjie Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/270,290

(22) Filed: Feb. 7, 2019

(65) Prior Publication Data

US 2019/0173551 A1 Jun. 6, 2019

Related U.S. Application Data

(63) Continuation of application No. PCT/CN2017/096777, filed on Aug. 10, 2017.

(30) Foreign Application Priority Data

Aug. 12, 2016 (CN) .......................... 201610662175.8

(51) Int. Cl.
*H04B 7/06* (2006.01)
*H04B 17/309* (2015.01)
(Continued)

(52) U.S. Cl.
CPC ......... *H04B 7/0626* (2013.01); *H04B 7/0617* (2013.01); *H04B 17/309* (2015.01);
(Continued)

(58) Field of Classification Search
None
See application file for complete search history.

(56) References Cited

U.S. PATENT DOCUMENTS

| 9,398,574 B2 * | 7/2016 | Gao ....................... H04L 1/0026 |
| 2012/0157082 A1 * | 6/2012 | Pedersen ............... H04W 24/10 |
| | | 455/422.1 |

(Continued)

FOREIGN PATENT DOCUMENTS

| CN | 102291211 A | 12/2011 |
| CN | 102469608 A | 5/2012 |

(Continued)

OTHER PUBLICATIONS

International Search Report dated Sep. 25, 2017 in corresponding International Application No. PCT/CN2017/096777.

(Continued)

*Primary Examiner* — Anh Vu H Ly

(74) *Attorney, Agent, or Firm* — Leydig, Voit & Mayer, Ltd.

(57) ABSTRACT

The present application discloses a measurement method and an apparatus, so that a measurement result meets a CoMP requirement while feedback overheads are reduced. The measurement method includes: sending, by a first network device, a restricted channel state information CSI measurement instruction to a second network device, where the restricted CSI measurement instruction is used to instruct the second network device to perform restricted CSI measurement; and receiving, by the first network device, CSI sent by the second network device, where the CSI is generated after the CSI measurement is completed based on the CSI measurement instruction.

4 Claims, 5 Drawing Sheets

(51) Int. Cl.
H04L 1/00 (2006.01)
H04L 5/00 (2006.01)
H04L 25/03 (2006.01)
H04W 24/10 (2009.01)

(52) U.S. Cl.
CPC .......... *H04L 1/0026* (2013.01); *H04L 5/0048* (2013.01); *H04L 25/03904* (2013.01); *H04L 25/03923* (2013.01); *H04W 24/10* (2013.01)

(56) References Cited

U.S. PATENT DOCUMENTS

| | | | |
|---|---|---|---|
| 2013/0077523 A1* | 3/2013 | Ko | H04W 24/00 370/252 |
| 2014/0044061 A1* | 2/2014 | Yue | H04W 72/042 370/329 |
| 2014/0341057 A1 | 11/2014 | Seo et al. | |
| 2015/0215018 A1 | 7/2015 | Xiong et al. | |
| 2015/0256280 A1* | 9/2015 | Park | H04J 11/005 370/329 |
| 2015/0372737 A1* | 12/2015 | Park | H04W 16/28 370/329 |
| 2016/0127936 A1 | 5/2016 | Chatterjee et al. | |
| 2016/0142189 A1* | 5/2016 | Shin | H04B 7/0626 370/329 |
| 2016/0192229 A1* | 6/2016 | Liu | H04L 1/0026 455/423 |
| 2016/0269082 A1 | 9/2016 | Gao et al. | |
| 2017/0195029 A1* | 7/2017 | Nammi | H04B 7/0456 |
| 2017/0331535 A1* | 11/2017 | Wei | H04B 7/0469 |
| 2018/0351621 A1* | 12/2018 | Wei | H04L 5/0023 |
| 2019/0372641 A1* | 12/2019 | Muruganathan | H04B 7/0626 |

FOREIGN PATENT DOCUMENTS

| | | |
|---|---|---|
| CN | 103580820 A | 2/2014 |
| CN | 103918205 A | 7/2014 |
| CN | 103929267 A | 7/2014 |
| EP | 2744137 A1 | 6/2014 |
| WO | 2015190956 A1 | 12/2015 |

OTHER PUBLICATIONS

"Correction on the linkage between CSI-RS and CSI-IM for Class B," 3GPP TSG RAN WG1 Meeting #84bis, Busan, Korea, R1-163513, XP051659704, 3rd Generation Partnership Project, Valbonne, France (Apr. 11-15, 2016).

3GPP TS 36.331 V13.0.0 (Dec. 2015) "3rd Generation Partnership Project; Technical Specification Group Radio Access Network; Evolved Universal Terrestrial Radio Access (E-UTRA); Radio Resource Control (RRC); Protocol specification" (Release 13), total 507 pages.

3GPP TS 36.211 V13.2.0 (Jun. 2016) "3rd Generation Partnership Project; Technical Specification Group Radio Access Network; Evolved Universal Terrestrial Radio Access (E-UTRA); Physical channels and modulation" (Release 13), total 168 pages.

3GPP TS 36.213 V13.2.0 (Jun. 2016) "3rd Generation Partnership Project; Technical Specification Group Radio Access Network; Evolved Universal Terrestrial Radio Access (E-UTRA); Physical layer procedures" (Release 13), total 381 pages.

International Search Report dated Sep. 27, 2017 in corresponding International Patent Application No. PCT/CN2017/096777 (7 pages).

Written Opinion of the International Searching Authority dated Sep. 27, 2017 in corresponding International Patent Application No. PCT/CN2017/096777 (3 pages).

* cited by examiner

MEASUREMENT METHOD, AND APPARATUS

CROSS-REFERENCE TO RELATED APPLICATIONS

This application is a continuation of International Application No. PCT/CN2017/096777, filed on Aug. 10, 2017, which claims priority to Chinese Patent Application No. 201610662175.8, filed on Aug. 12, 2016, The disclosures of the aforementioned applications are hereby incorporated by reference in their entireties.

TECHNICAL FIELD

The present application relates to the communications field, and more specifically, to a measurement method and an apparatus.

BACKGROUND

A multiple-input multiple-output (MIMO) technology is considered as one of key technologies that can implement high-rate data transmission in the future, and has a spacious application prospect in 4th generation and 5th generation mobile communications systems. A plurality of transmit antennas in a conventional centralized MIMO system are centralized on a base station (BS) end. Different from the centralized MIMO, a distributed MIMO system has a plurality of transmit antennas distributed at different geographical locations, and allows pairs of transmit and receive links thereof to be more independent of each other. Therefore, the distributed MIMO system has advantages such as a large capacity, low power consumption, better coverage, and low electromagnetic damage to a human body, and is considered as one of alternative solutions for a future wireless communications system.

Coordinated multipoint transmission (CoMP) in the prior art is considered as an effective method for resolving an inter-cell interference problem and increasing an edge-user throughput. In the CoMP technology, a plurality of adjacent cells can jointly process or coordinate an edge user, to avoid interference and increase an edge-user throughput. Downlink CoMP technologies mainly include joint transmission (JT), coordinated scheduling and beamforming (CS/CB), and dynamic point selection/dynamic point blanking (DPS/DPB). To implement the CoMP scheduling, a serving base station needs to know conditions of downlink channels from stations to a target user.

The LTE standards in a current 3GPP protocol provide a reference signal, namely, a channel state information-reference signal (CSI-RS). The CSI-RS is used by a terminal to obtain channel state information (CSI), and report the channel state information to a serving base station by using a physical uplink control channel (PUCCH) or a physical uplink shared channel (PUSCH). The reported CSI may include one or more of the following information: a channel quality indicator (CQI), a rank indicator (RI), or a precoding matrix indicator (PMI). In some reporting manners, a user is further required to report a sub-band indicator. To instruct UE to receive and process a specified CSI-RS and provide required feedback information, a base station needs to configure higher layer signaling such as radio resource control (RRC) signaling.

In a CSI measurement solution used in the existing CoMP technology, for all CSI processes configured on a network side, user equipment performs measurement based on an assumption of single cell transmission, and reports corresponding CSI. Different CSI processes are independent of each other. With an increase in beams of a current transmission point (TP), an inter-cell interference situation is more complicated. The UE can measure and feed back a channel state of a neighboring cell in existing measurement. However, to obtain a beam that is of each coordinated transmission point and that causes strongest interference, when there are a relatively large quantity of coordinated TPs, both measurement complexity and feedback overheads of the UE are relatively high. In addition, the UE does not distinguish between a serving cell and a coordinated cell when measuring the serving cell and the coordinated cell. In other words, the UE performs same measurement for the serving cell and the coordinated cell, for example, independently reports an RI and/or a PMI for both the serving cell and the coordinated cell. When a rank fed back by the UE is inconsistent with a rank used by a neighboring TP to send data, the neighboring base station cannot accurately avoid a codebook. In this case, the existing CSI measurement cannot meet a CS/CB requirement, and consequently performance is reduced.

SUMMARY

Embodiments of the present application provide a measurement method and an apparatus, so that a measurement result meets a CoMP requirement while measurement complexity and feedback overheads are reduced.

A first aspect of the embodiments of the present application provides a measurement method, including: sending, by a first network device, a restricted channel state information CSI measurement instruction to a second network device, where the restricted CSI measurement instruction is used to instruct the second network device to perform restricted CSI measurement; and receiving, by the first network device, CSI sent by the second network device, where the CSI is generated after the CSI measurement is completed based on the CSI measurement instruction.

The first network device sends the restricted CSI measurement instruction to the second network device. The second network device performs restricted CSI measurement based on the restricted CSI measurement instruction, so that the second network device completes all default measurement without a feedback; or the second network device performs measurement based on the restricted CSI measurement instruction without feeding back all measurement results. This reduces measurement complexity of the second network device, and reduces feedback overheads. In addition, the restricted CSI measurement instruction sent by the first network device instructs the second network device to send only CSI required by the first network device. This eliminates interference caused by receiving excessive irrelevant CSI, so that the first network device obtains accurate measurement information, reducing coordination complexity.

With reference to the first aspect, in a first possible implementation, the restricted CSI measurement instruction is a restricted rank measurement instruction, the restricted rank measurement instruction is used to instruct the second network device to measure a restricted rank, and a quantity of restricted ranks is less than a quantity of all ranks.

With reference to the first possible implementation of the first aspect, in a second possible implementation, the restricted rank measurement instruction is configured for a CSI process identifier, and the CSI process identifier is corresponding to a to-be-measured rank.

With reference to the first possible implementation of the first aspect, in a third possible implementation, the restricted rank measurement instruction is configured for a channel state information-reference signal CSI-RS resource identifier ID, and the CSI-RS resource ID is corresponding to a to-be-measured rank.

With reference to the first possible implementation of the first aspect, in a fourth possible implementation, the restricted rank measurement instruction is configured for a channel state information-interference measurement CSI-IM resource ID, and the CSI-IM resource ID is corresponding to a to-be-measured rank.

A second aspect of the embodiments of the present application provides a measurement method, including: receiving, by a second network device, a restricted CSI measurement instruction sent by a first network device, where the restricted CSI measurement instruction is used to instruct the second network device to perform restricted CSI measurement; performing, by the second network device, the restricted CSI measurement based on the restricted CSI measurement instruction; and sending, by the second network device, CSI to the first network device, where the CSI is generated after the second network device completes the CSI measurement based on the CSI measurement instruction.

With reference to the second aspect, in a first possible implementation, the restricted CSI measurement instruction is a restricted rank measurement instruction, the restricted rank measurement instruction is used to instruct the second network device to measure a restricted rank, and a quantity of restricted ranks is less than a quantity of all ranks.

With reference to the first possible implementation of the second aspect, in a second possible implementation, the restricted rank measurement instruction is configured for a CSI process identifier, and the CSI process identifier is corresponding to a to-be-measured rank.

With reference to the first possible implementation of the second aspect, in a third possible implementation, the restricted rank measurement instruction is configured for a channel state information-reference signal CSI-RS resource identifier ID, and the CSI-RS resource ID is corresponding to a to-be-measured rank.

With reference to the first possible implementation of the second aspect, in a fourth possible implementation, the restricted rank measurement instruction is configured for a channel state information-interference measurement CSI-IM resource ID, and the CSI-IM resource ID is corresponding to a to-be-measured rank.

A third aspect of the embodiments of the present application provides a network device, including: a sending module, where the sending module is configured to send a restricted channel state information CSI measurement instruction to user equipment, and the restricted CSI measurement instruction is used to instruct the second network device to perform restricted CSI measurement; a processing module, configured to instruct the sending module to send the restricted CSI measurement instruction; and a receiving module, where the receiving module is configured to receive CSI sent by the user equipment, and the CSI is generated after the CSI measurement is completed based on the CSI measurement instruction.

The first network device sends the restricted CSI measurement instruction to the second network device. The second network device performs restricted CSI measurement based on the restricted CSI measurement instruction, so that the second network device completes all default measurement without a feedback; or the second network device performs measurement based on the restricted CSI measurement instruction without feeding back all measurement results. This reduces measurement complexity of the second network device, and reduces feedback overheads. In addition, the restricted CSI measurement instruction sent by the first network device instructs the second network device to send only CSI required by the first network device. This eliminates interference caused by receiving excessive irrelevant CSI, so that the first network device obtains accurate measurement information, reducing coordination complexity.

With reference to the third aspect, in a first possible implementation, the restricted CSI measurement instruction is a restricted rank measurement instruction, the restricted rank measurement instruction is used to instruct the second network device to measure a restricted rank, and a quantity of restricted ranks is less than a quantity of all ranks.

With reference to the first possible implementation of the third aspect, in a second possible implementation, the restricted rank measurement instruction is configured for a CSI process identifier, and the CSI process identifier is corresponding to a to-be-measured rank.

With reference to the first possible implementation of the third aspect, in a third possible implementation, the restricted rank measurement instruction is configured for a channel state information-reference signal CSI-RS resource identifier ID, and the CSI-RS resource ID is corresponding to a to-be-measured rank.

With reference to the first possible implementation of the third aspect, in a fourth possible implementation, the restricted rank measurement instruction is configured for a channel state information-interference measurement CSI-IM resource ID, and the CSI-IM resource ID is corresponding to a to-be-measured rank.

A fourth aspect of the embodiments of the present application provides user equipment, including: a receiving module, where the receiving module is configured to receive a restricted CSI measurement instruction sent by a network device, and the restricted CSI measurement instruction is used to instruct the user equipment to perform restricted CSI measurement; a processing module, configured to perform restricted CSI measurement based on the restricted CSI measurement instruction; and a sending module, configured to send CSI to the network device, where the CSI is generated after the user equipment completes the CSI measurement based on the CSI measurement instruction.

With reference to the fourth aspect, in a first possible implementation, the restricted CSI measurement instruction is a restricted rank measurement instruction, the restricted rank measurement instruction is used to instruct the second network device to measure a restricted rank, and a quantity of restricted ranks is less than a quantity of all ranks.

With reference to the first possible implementation of the fourth aspect, in a second possible implementation, the restricted rank measurement instruction is configured for a CSI process identifier, and the CSI process identifier is corresponding to a to-be-measured rank.

With reference to the first possible implementation of the fourth aspect, in a third possible implementation, the restricted rank measurement instruction is configured for a channel state information-reference signal CSI-RS resource identifier ID, and the CSI-RS resource ID is corresponding to a to-be-measured rank.

With reference to the first possible implementation of the fourth aspect, in a fourth possible implementation, the restricted rank measurement instruction is configured for a channel state information-interference measurement CSI- IM resource ID, and the CSI-IM resource ID is corresponding to a to-be-measured rank.

With reference to the first aspect, in a second possible implementation, the restricted CSI measurement instruction is a codebook feedback restriction instruction, the codebook feedback restriction instruction is used to instruct the second network device to feed back a measurement result of a codebook identifier indicated in the codebook feedback restriction instruction, and a quantity of codebook identifiers indicated in the codebook feedback restriction instruction is less than a quantity of all codebook identifiers.

With reference to the second possible implementation of the first aspect, in a fifth possible implementation, the codebook feedback restriction instruction is configured for a CSI process identifier, and the CSI process identifier is corresponding to the codebook identifier that is to be fed back.

With reference to the second possible implementation of the first aspect, in a sixth possible implementation, the codebook feedback restriction instruction is configured for a CSI-RS resource ID, and the CSI-RS resource ID is corresponding to the codebook identifier that is to be fed back.

With reference to the second possible implementation of the first aspect, in a seventh possible implementation, the codebook feedback restriction instruction is configured for a CSI-IM resource ID, and the CSI-IM resource ID is corresponding to the codebook identifier that is to be fed back.

With reference to the second aspect, in a second possible implementation, the restricted CSI measurement instruction is a codebook feedback restriction instruction, the codebook feedback restriction instruction is used to instruct the second network device to feed back a measurement result of a codebook identifier indicated in the codebook feedback restriction instruction, and a quantity of codebooks indicated in the codebook feedback restriction instruction is less than a quantity of all codebooks.

With reference to the second possible implementation of the second aspect, in a fifth possible implementation, the codebook feedback restriction instruction is configured for a CSI process identifier, and the CSI process identifier is corresponding to the codebook identifier that is to be fed back.

With reference to the second possible implementation of the second aspect, in a sixth possible implementation, the codebook feedback restriction instruction is configured for a CSI-RS resource ID, and the CSI-RS resource ID is corresponding to the codebook identifier that is to be fed back.

With reference to the second possible implementation of the second aspect, in a seventh possible implementation, the codebook feedback restriction instruction is configured for a CSI-IM resource ID, and the CSI-IM resource ID is corresponding to the codebook identifier that is to be fed back.

With reference to the third aspect, in a second possible implementation, the restricted CSI measurement instruction is a codebook feedback restriction instruction, the codebook feedback restriction instruction is used to instruct the second network device to feed back a measurement result of a codebook identifier indicated in the codebook feedback restriction instruction, and a quantity of codebook identifiers indicated in the codebook feedback restriction instruction is less than a quantity of all codebook identifiers.

With reference to the second possible implementation of the third aspect, in a fifth possible implementation, the codebook feedback restriction instruction is configured for a CSI process identifier, and the CSI process identifier is corresponding to the codebook identifier that is to be fed back.

With reference to the second possible implementation of the third aspect, in a sixth possible implementation, the codebook feedback restriction instruction is configured for a CSI-RS resource ID, and the CSI-RS resource ID is corresponding to the codebook identifier that is to be fed back.

With reference to the second possible implementation of the third aspect, in a seventh possible implementation, the codebook feedback restriction instruction is configured for a CSI-IM resource ID, and the CSI-IM resource ID is corresponding to the codebook identifier that is to be fed back.

With reference to the fourth aspect, in a second possible implementation, the restricted CSI measurement instruction is a codebook feedback restriction instruction, the codebook feedback restriction instruction is used to instruct the second network device to feed back a measurement result of a codebook identifier indicated in the codebook feedback restriction instruction, and a quantity of codebook identifiers indicated in the codebook feedback restriction instruction is less than a quantity of all codebook identifiers.

With reference to the second possible implementation of the fourth aspect, in a fifth possible implementation, the codebook feedback restriction instruction is configured for a CSI process identifier, and the CSI process identifier is corresponding to the codebook identifier that is to be fed back.

With reference to the second possible implementation of the fourth aspect, in a sixth possible implementation, the codebook feedback restriction instruction is configured for a CSI-RS resource ID, and the CSI-RS resource ID is corresponding to the codebook identifier that is to be fed back.

With reference to the second possible implementation of the fourth aspect, in a seventh possible implementation, the codebook feedback restriction instruction is configured for a CSI-IM resource ID, and the CSI-IM resource ID is corresponding to the codebook identifier that is to be fed back.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other accompanying drawings from these accompanying drawings without creative efforts.

FIG. 4 (*b*) is a schematic diagram of an 8-antenna W1 according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

It should be understood that, the technical solutions in the embodiments of the present application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or a future 5G system. It may be understood that the technical solutions in the embodiments of the present application may be applied to communication between a network device and user equipment; may be applied to communication between user equipments, for example, between a transmit end and a receive end in a device-to-device (D2D) scenario, a machine-to-machine (M2M) scenario, or another scenario; or may be applied to communication between network devices, for example, between a transmit end and a receive end in a scenario of communication between base stations, for example, between a macro base station and a micro base station in a macro-micro coordination scenario.

Figure 1:
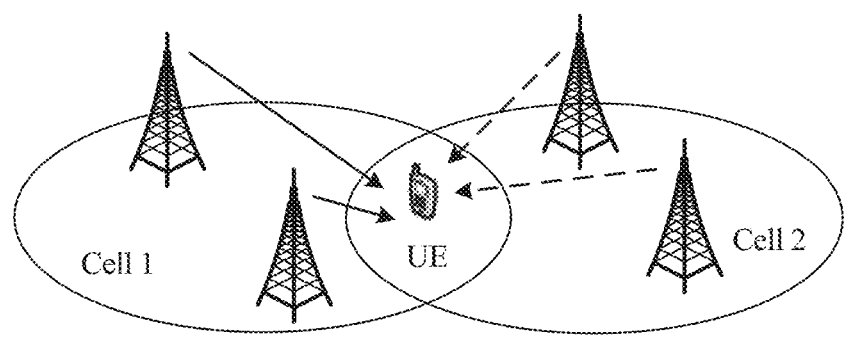
FIG. 1 is a schematic architectural diagram of a communications system to which an embodiment of the present application is applied.

FIG. 1 shows a CoMP multipoint transmission wireless communications system 100 to which an embodiment of the present application is applied. Coordinated multipoint transmission/reception indicates that a plurality of transmission points at separate geographical locations coordinate with each other to transmit data for one terminal or jointly receive data sent by one terminal, or a plurality of transmission points perform coordinated scheduling or coordinated beamforming. The wireless communications system 100 may be a homogeneous network or a heterogeneous network, and also imposes no limitation on transmission points. Coordinated multipoint transmission may be performed between macro base stations, between micro base stations, or between a macro base station and a micro base station. The transmission point in this embodiment of this application may be used for coordinated transmission. For example, the transmission point may be a base station. A coordinated transmission point may be a serving base station, or may be a coordinated base station. A coordinated transmission point may alternatively be a remote radio unit (RRU) in a distributed base station. Signals sent from any two of the plurality of coordinated transmission points may have different large-scale fading characteristics (that is, co-location is not permitted), and may belong to a same cell or belong to different cells. This is not limited. The wireless communications system 100 may include at least two transmission points. In the system shown in FIG. 1, four transmission points are used as an example. Two transmission points belong to a cell 1, and the other two transmission points belong to a cell 2. User equipment (UE) is located in an overlapping area of edges of the cell 1 and the cell 2. For the UE, the transmission points in the cell 1 are primary transmission points, and the transmission points in the cell 2 are coordinated transmission points.

It should be understood that in this embodiment of the present application, the transmission point may be a base transceiver station (BTS) in a GSM system or a CDMA system, may be a NodeB (NB) in a WCDMA system, may be an evolved NodeB (eNB or eNodeB) in an LTE system, or may be a radio controller in a cloud radio access network (CRAN). Alternatively, the network device may be a relay node, an access point, an in-vehicle device, a wearable device, a network-side device in a future 5G network, a network device in a future evolved public land mobile network (PLMN), or the like.

The UE may be mobile or immobile. The UE may be an access terminal, user equipment, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, user equipment in a future 5G network, user equipment in a future evolved PLMN, or the like.

FIG. 1 shows an example of four transmission points and one user equipment (UE). Optionally, the wireless communications system 100 may include a plurality of transmission points, and another quantity of user equipments may be included in a coverage range of each transmission point. This is not limited in this embodiment of the present application.

Optionally, the wireless communications system 100 may further include other network entities such as a network controller and a mobility management entity. This embodiment of the present application is not limited thereto.

The wireless communications system 100 may support CoMP, that is, a plurality of cells or a plurality of transmission points may coordinate with each other to send data to same user equipment in a same time-frequency resource. The plurality of cells may belong to a same network device or different network devices, and may be selected based on a channel gain, a path loss, received signal strength, received signal quality, or the like. Antenna port sets of any two of the plurality of transmission points may not have a same large-scale characteristic (that is, co-location is not permitted), and may belong to a same cell or belong to different cells. This is not limited in this embodiment of the present application. For the same large-scale characteristic, refer to a definition in the 3GPP standards. Alternatively, the same large-scale characteristic may be set based on an actual system requirement. The definition in the current 3GPP standards is that a large-scale characteristic of a channel through which a signal is transmitted from an antenna port may be inferred from a large-scale characteristic of a channel through which a signal is transmitted from another antenna port. For the large-scale characteristic, refer to a definition in the 3GPP standards. Alternatively, the large-scale characteristic may be set based on an actual system requirement. In the current 3GPP standards, the large-scale characteristic may include one or more of delay spread, Doppler spread, Doppler frequency shift, an average gain, and an average delay.

Optionally, if the user equipment is located at a cell edge and a user throughput is relatively low (for example, lower than 5% of a user rate cumulative distribution function (CDF) curve), the plurality of cells may coordinate with each other to respectively send same data to the user equipment in a same time-frequency resource, to implement signal enhancement and interference reduction of the user equipment. Optionally, for user equipment located at a cell edge or located at another cell area, the plurality of cells or the plurality of transmission points may coordinate with each other to perform multi-beam transmit diversity or multi-stream spatial multiplexing transmission, that is, the plurality of cells or the plurality of transmission points may send different modulation signals (including different modulation signals of same data or different modulation signals of different data) to the user equipment in a same time-frequency resource or different time-frequency resources, to improve data transmission reliability or data transmission efficiency. However, this embodiment of the present application is not limited thereto.

Figure 2:
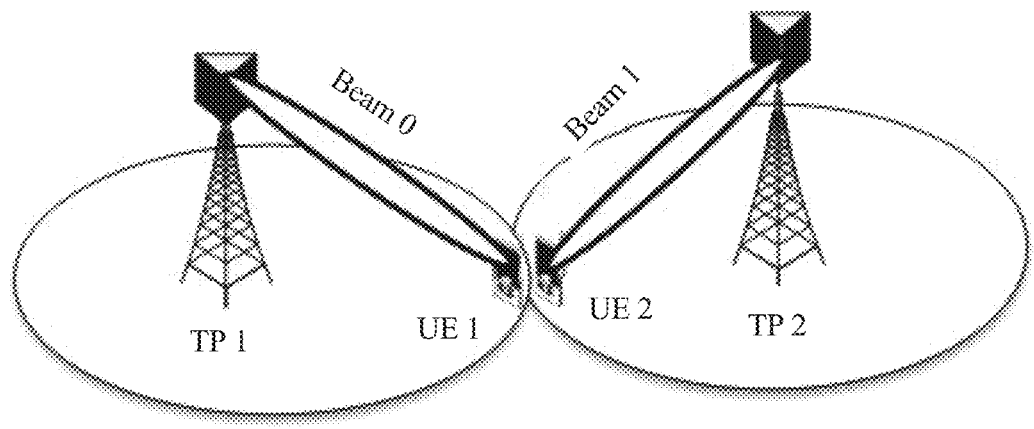
FIG. 2 is a schematic architectural diagram of a communications system to which an embodiment of the present application is applied.

CS/CB refers to coordinated scheduling or coordinated beamforming between transmission points for reducing data transmission interference between the transmission points. As shown in FIG. 2, when a TP 1 transmits data to UE 1, if a TP 2 also transmits data to UE 2, UEs suffer from relatively great interference when receiving data. Consequently, signal quality is poor, and data transmission fails. Therefore, coordinated scheduling between transmission points may be considered. That is, when the TP 1 schedules the UE 1, the TP 2 does not schedule the UE 2. Alternatively, when the TP 1 uses a beam 1 to transmit data, the TP 2 does not use a beam 2 to transmit data at the same moment, and the TP 2 may use a beam in another direction to transmit data.

Figure 3:
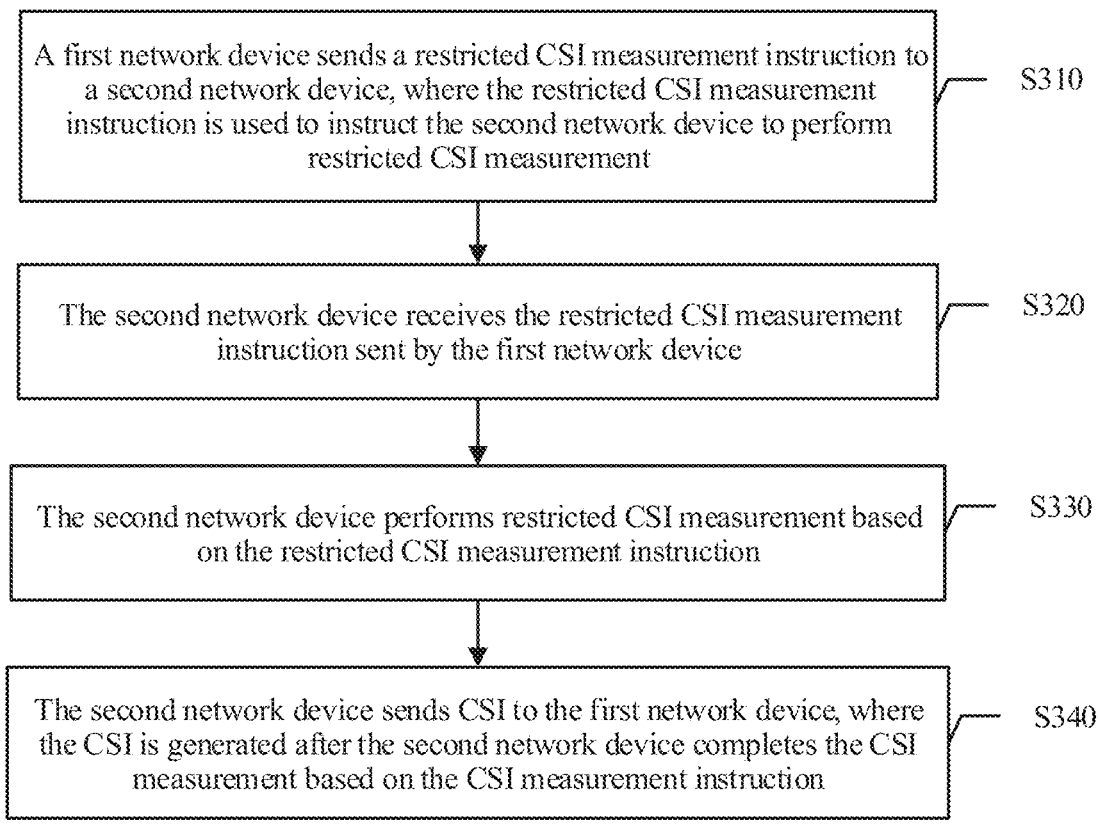
FIG. 3 is a processing flowchart of a measurement method according to an embodiment of the present application.

FIG. 3 is a schematic flowchart of a measurement method 300 according to an embodiment of the present application.

S310. A first network device sends a restricted CSI measurement instruction to a second network device, where the restricted CSI measurement instruction is used to instruct the second network device to perform restricted CSI measurement.

S320. The second network device receives the restricted CSI measurement instruction sent by the first network device.

S330. The second network device performs restricted CSI measurement based on the restricted CSI measurement instruction.

S340. The second network device sends CSI to the first network device, where the CSI is generated after the second network device completes the CSI measurement based on the CSI measurement instruction.

In this embodiment of the present application, the first network device may be a transmission point, namely, a network device such as a base station or another transmission point in the embodiment shown in FIG. 1 or FIG. 2, and the second network device may be a network device such as UE in the embodiment shown in FIG. 1 or FIG. 2.

The first network device sends the restricted CSI measurement instruction to the second network device. The second network device performs restricted CSI measurement based on the restricted CSI measurement instruction, so that the second network device completes all default measurement without a feedback; or the second network device performs measurement based on the restricted CSI measurement instruction without feeding back all measurement results. This reduces measurement complexity of the second network device, and reduces feedback overheads. In addition, the restricted CSI measurement instruction sent by the first network device instructs the second network device to send only CSI required by the first network device. This eliminates interference caused by receiving excessive irrelevant CSI, so that the first network device obtains accurate measurement information, reducing coordination complexity.

Specifically, the restricted CSI measurement instruction may be a restricted rank measurement instruction. A rank is a space dimension, namely, space orthogonality. In other words, the rank is a channel matrix rank. That a rank value is N indicates that N parallel effective data streams can be transmitted, where N is a positive integer. A quantity of ranks is less than or equal to a quantity of antenna ports, and is also less than or equal to a quantity of receive antennas. User equipment reports a measured rank value RI (rank Indicator) to a base station. However, the base station uses the RI merely as a reference for selecting a quantity of layers, namely, a quantity of streams. An actually selected layer value should be less than or equal to the RI value. In other words, the layer value is a value determined by using a scheduling policy.

The restricted rank measurement instruction is used to instruct the second network device to measure a restricted rank, and the rank value is used to identify a specific rank. A quantity of restricted ranks is less than a quantity of all ranks, and the quantity of all ranks is a maximum value in a set of values that are less than or equal to a quantity of receive antennas of the UE and that are less than or equal to a quantity of transmit antennas of the base station. The first network device instructs the second network device to measure only the specified rank. This reduces measurement complexity of the second network device, and reduces feedback overheads. In addition, the restricted CSI measurement instruction sent by the first network device instructs the second network device to measure only CSI required by the first network device. This eliminates interference caused by receiving excessive irrelevant CSI, so that the first network device obtains accurate measurement information, reducing coordination complexity.

The restricted rank measurement instruction may have three different instruction forms:

(1) The restricted rank measurement instruction is configured for a CSI process identifier, the CSI process identifier is corresponding to a to-be-measured rank, and a rank value of the to-be-measured rank is less than the quantity of all ranks, namely, a quantity of all ranks supported by the UE.

That the CSI process identifier is corresponding to a to-be-measured rank means that the restricted rank measurement instruction is used to instruct the second network device to measure the restricted rank, and the second network device can determine, based on the CSI process identifier, a rank/ranks that needs/need to be measured.

For each serving cell, one or more CSI Processes may be configured for the UE, and one CSI process is associated with one or more CSI-RS resources and one or more channel state information-interference measurement (CSI-IM) resources. The base station instructs the UE to perform rank-restricted measurement for the CSI process. Specifically, the base station may add signaling "rank-Restriction-r14" to RRC signaling, to indicate whether rank-restricted measurement is to be performed, or indicate to-be-measured ranks.

A specific rank value may be set as rank=1 by default. Because there are most beam directions when rank=1, in this case, UE complexity can be reduced, and further the UE can measure and feed back one beam that is most aligned with the UE. Therefore, when coordination is performed between TPs, a coordinated point can be enabled to avoid only the beam, to improve avoidance accuracy. In this case, an interference beam of a neighboring TP can be more accurately measured.

Alternatively, when the coordinated TP determines a to-be-used rank, a rank value in this case may be notified by using higher layer signaling (for example, RRC signaling). For example, 1 bit, 2 bits, or 3 bits in the higher layer signaling indicates/indicate a specific rank value (when 2 bits indicate the specific rank value, 00 indicates rank=1, 01 indicates rank=2, 10 indicates rank=3, and 11 indicates rank=4. Other cases can be deduced from this). The UE performs corresponding measurement based on the indicated rank value. Therefore, UE complexity can be reduced, and further a specific transmission rank of the coordinated TP can be measured, to improve accuracy.

The solution in this embodiment is applicable to a scenario in which measurement for the serving TP and measurement for a neighboring TP are performed in different CSI processes.

The base station sends the rank value of the to-be-measured rank to the UE, and the UE performs CSI measurement on the rank indicated by the rank value.

The UE sends a measurement result to the first network device. The measurement result includes only a PMI, or may further include the CQI. The UE can notify the serving base station of an interference PMI of the UE for a coordinated base station by feeding back only the PMI, and the coordinated base station only needs to avoid the interference PMI. In addition, feedback overheads can be reduced. The first network device knows the interference PMI of the UE for the coordinated base station based on the feedback of the UE, and the coordinated base station avoids the PMI when performing data transmission, so that when the serving base station transmits data to the UE, interference caused by the coordinated base station is reduced, thereby increasing a UE throughput.

(2) The restricted rank measurement instruction is configured for a CSI-RS resource ID, the CSI-RS resource ID is corresponding to a to-be-measured rank, and a rank value of the to-be-measured rank is less than the quantity of all ranks, namely, a quantity of all ranks supported by the UE. The solution is applicable to a scenario in which measurement for the serving TP and measurement for a neighboring TP are performed in a same CSI process, and different TPs are corresponding to different NZPIDs.

That the CSI-RS resource ID is corresponding to a to-be-measured rank means that the restricted rank measurement instruction is used to instruct the second network device to measure the restricted rank, and the second network device can determine, based on the CSI-RS resource ID, a rank/ranks that needs/need to be measured.

Specifically, the base station instructs, based on a CSI-RS resource configuration rank restriction list in CSI-RS-ConfigNZPIDList, the UE to perform different rank-restricted CSI measurement for different CSI-RS resource IDs.

The first network device may add, to RRC signaling, a corresponding indication, for example, "rank-RestrictionList-r14 SEQUENCE(SIZE (1 . . . 7)) OF ENUMERATED {true, false} OPTIONAL—Need OR".

For a beamformed CSI-RS, a TP may configure a restricted rank measurement instruction for each NZP CSI-RS resource ID.

SIZE (1 . . . 7) in rank-RestrictionList-r14 SEQUENCE (SIZE (1 . . . 7)) OF ENUMERATED {true, false} indicates a configured size of the field. For example, a maximum value is 7. A value of the field may be consistent with, in other words, in a one-to-one correspondence with a size of CSI-RS-ConfigNZPIDList-r14, or less than a size of CSI-RS-ConfigNZPIDList-r14. For example, a resource indicated by a first ID may be a resource of a serving cell by default, and in this case, the rank-restricted measurement is not used. Therefore, the size of the field of rank-RestrictionList-r14 is less than the size of the field of CSI-RS-ConfigNZPIDList-r14. When true is indicated, it indicates that the rank-restricted measurement is to be used, and when false is indicated, it indicates that the rank-restricted measurement is not to be used.

After receiving the rank-restricted measurement instruction, the UE may perform rank-restricted measurement for a specific NZP CSI-RS ID resource/some specific NZP CSI-RS ID resources in the CSI process. A specific rank value may be predefined in a protocol. For example, rank=1. Because there are most beam directions when rank=1, in this case, UE complexity can be reduced, and further the UE can measure and feed back one beam that is most aligned with the UE. Therefore, when coordination is performed between TPs, a coordinated point can be enabled to avoid only the beam, to improve avoidance accuracy. In this case, an interference beam of a neighboring TP can be more accurately measured. Alternatively, when the coordinated TP determines a to-be-used transmission rank, an interference rank value in this case may be notified by using higher layer signaling. For example, 1 bit, 2 bits, or 3 bits in the higher layer signaling indicates/indicate a specific rank value (when 2 bits indicate the specific rank value, 00 indicates rank=1, 01 indicates rank=2, 10 indicates rank=3, and 11 indicates rank=4. Other cases can be deduced from this). The UE performs corresponding measurement based on the indicated rank value. Therefore, UE complexity can be reduced, and further a specific transmission rank of the coordinated TP can be measured, to improve accuracy.

The UE receives rank-RestrictionList signaling, and determines, based on the signaling, whether to perform rank-restricted CSI measurement for the corresponding CSI-RS resource ID.

The UE may feed back only a PMI, to reduce feedback overheads. Alternatively, the UE feeds back a PMI and a CQI, and in this case, strength of a signal from the coordinated TP can be provided. This can assist, to some extent, in performing coordinated transmission.

(3) The restricted rank measurement instruction is configured for a CSI-IM resource ID, the CSI-IM resource ID is corresponding to a to-be-measured rank, and a rank value of the to-be-measured rank is less than the quantity of all ranks, namely, a quantity of all ranks supported by the UE.

That the CSI-IM resource ID is corresponding to a to-be-measured rank means that the restricted rank measurement instruction is used to instruct the second network device to measure the restricted rank, and the second network device can determine, based on the CSI-IM resource ID, a rank/ranks that needs/need to be measured.

The solution is applicable to a scenario in which measurement for the serving TP and measurement for a neighboring TP are performed in a same CSI process, and different TPs are corresponding to different CSI-IM IDs. Specifically, the base station instructs, based on a CSI-IM resource configuration rank restriction list in CSI-IM-ConfigIDList, the UE to perform different rank-restricted CSI measurement for different CSI-IM resource IDs.

The first network device may add, to RRC signaling, a corresponding indication, for example, "rank-RestrictionList-r14 SEQUENCE(SIZE (1 . . . 7)) OF ENUMERATED {true, false} OPTIONAL—Need OR".

SIZE (1 . . . 7) in rank-RestrictionList-r14 SEQUENCE (SIZE (1 . . . 7)) OF ENUMERATED {true, false} indicates a configured size of the field. For example, a maximum value is 7. A value of the field may be consistent with, in other words, in a one-to-one correspondence with a size of CSI-RS-ConfigNZPIDList-r14, or less than a size of CSI-RS-ConfigNZPIDList-r14. For example, a resource indicated by a first ID may be a resource of a serving cell by default, and in this case, the rank-restricted measurement is not used. Therefore, the size of the field of rank-RestrictionList-r14 is less than the size of the field of CSI-RS-ConfigNZPIDList-r14. When true is indicated, it indicates that the rank-restricted measurement is to be used, and when false is indicated, it indicates that the rank-restricted measurement is not to be used.

After receiving the rank-restricted measurement instruction, the UE may perform rank-restricted measurement for a specific CSI-IM resource/some specific CSI-IM resources in the CSI-IM in the CSI process. A specific rank value may be predefined in a protocol. For example, rank=1. Because there are most beam directions when rank=1, in this case, UE complexity can be reduced, and further the UE can measure and feed back one beam that is most aligned with the UE. Therefore, when coordination is performed between TPs, a coordinated point can be enabled to avoid only the beam, to improve avoidance accuracy. In this case, an interference beam of a neighboring TP can be more accurately measured. Alternatively, when the coordinated TP determines a to-be-used transmission rank, an interference rank value in this case may be notified by using higher layer signaling. For example, 1 bit, 2 bits, or 3 bits in the higher layer signaling indicates/indicate a specific rank value (when 2 bits indicate the specific rank value, 00 indicates rank=1, 01 indicates rank=2, 10 indicates rank=3, and 11 indicates rank=4. Other cases can be deduced from this). The UE performs corresponding measurement based on the indicated rank value. Therefore, UE complexity can be reduced, and further a specific transmission rank of the coordinated TP can be measured, to improve accuracy.

The UE receives rank-RestrictionList signaling, and determines, based on the signaling, whether to perform rank-restricted CSI measurement for the corresponding CSI-IM resource ID.

The UE may feed back only a PMI, to reduce feedback overheads. Alternatively, the UE feeds back a PMI and a CQI, and in this case, strength of a signal from the coordinated TP can be provided. This can assist, to some extent, in performing coordinated transmission.

When the UE feeds back PMI information: rank=1, the coordinated transmission point may obtain interference beam information of the UE based on the PMI information. Even if the coordinated transmission point uses high-rank precoding to perform transmission, the coordinated point needs to consider performing avoidance provided that the high-rank precoding includes the interference beam information of the UE.

The present application provides another embodiment. In this embodiment, the restricted CSI measurement instruction is a codebook feedback restriction instruction, the codebook feedback restriction instruction is used to instruct the second network device to feed back a measurement result of a codebook identifier indicated in the codebook feedback restriction instruction, and a quantity of codebook identifiers indicated in the codebook feedback restriction instruction is less than a quantity of all codebook identifiers.

When a quantity of antenna ports of a TP is less than 8, for example, when the TP uses a 4-antenna codebook (the codebook is a precoding matrix and is relevant to a quantity of ranks and a quantity of antennas), a receive end and a transmit end share a same known codebook set, and the codebook set includes a plurality of precoding matrices. For a specific codebook, refer to the LTE standards.

Figure 4:
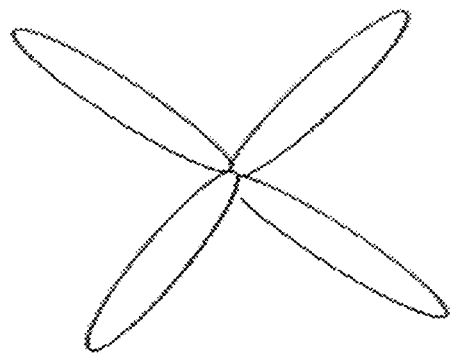
FIG. 4 (*a*) is a schematic diagram of a 4-antenna W1 according to an embodiment of the present application.
Figure 4:

A precoding matrix in each codebook may be corresponding to one beam direction. The codebook includes two parts: a first precoding matrix W1 (or referred to as i1) and a second precoding matrix W2 (or referred to as i2). W1 and W2 are codebook identifiers. W1 includes four beams that greatly differ in beam direction, as shown in FIG. 4 (a). Therefore, the UE needs to feed back W1 and W2.

Based on the foregoing rank-restricted solution, in this case, for the 4-antenna codebook, the UE needs to perform rank-restricted measurement for a restricted rank measurement resource, calculate W1 and W2 based on a restricted rank, and feed back W1 and W2 to the serving TP.

The network apparatus may first determine a quantity of antenna ports of the TP, and when the quantity of antenna ports of the TP is greater than or equal to 8, the codebook includes two parts: W1 (or referred to as i1) and W2 (or referred to as i2). W1 includes four beams in similar beam directions. As shown in FIG. 4 (b), degrees to which interference is caused to the UE in the four beams are relatively similar. Therefore, when measuring an interference beam of a neighboring TP, the UE may feed back only W1 without feeding back W2. This reduces UE complexity, and also reduces interference beam avoidance complexity of a coordinated TP.

The codebook feedback restriction instruction may have three different instruction forms:

(1) The codebook feedback restriction instruction is configured for a CSI process identifier, the CSI process identifier is corresponding to the codebook identifier that is to be fed back, and the quantity of codebook identifiers that are to be fed back is less than the quantity of all codebook identifiers.

Specifically, the first network device may add signaling "W1-feedback-r14 ENUMERATED {true} OPTIONAL—Need OR" to RRC signaling, to indicate whether codebook-restricted feedback is to be performed, or indicate codebook identifiers whose measurement results need to be fed back.

That the CSI process identifier is corresponding to the codebook identifier that is to be fed back means that the codebook feedback restriction instruction is used to instruct the second network device to feed back the measurement result of the codebook identifier indicated in the codebook feedback restriction instruction, and the second network device can determine, based on the CSI process identifier, a codebook identifier/codebook identifiers whose measurement result/measurement results needs/need to be fed back.

After receiving the codebook feedback restriction instruction, the UE may feed back, for the CSI process, only the measurement result of the codebook identifier indicated in the codebook feedback restriction instruction. As shown in FIG. 4 (b), only measurement on W1 is fed back. In this case, UE complexity can be reduced, and further the UE can measure and feed back a plurality of approximate beam domains aligned with the UE. Therefore, when coordination is performed between TPs, a coordinated point can be enabled to avoid only the beam domains, to improve avoidance accuracy. In this case, an interference beam of a neighboring TP can be more accurately measured.

(2) The codebook feedback restriction instruction is configured for a CSI-RS resource ID, the CSI-RS resource ID is corresponding to the codebook that is to be fed back, and the quantity of codebook identifiers that are to be fed back is less than the quantity of all codebook identifiers.

That the CSI-RS resource ID is corresponding to the codebook identifier that is to be fed back means that the codebook feedback restriction instruction is used to instruct the second network device to feed back the measurement result of the codebook identifier indicated in the codebook feedback restriction instruction, and the second network device can determine, based on the CSI-RS resource ID, a codebook identifier/codebook identifiers whose measurement result/measurement results needs/need to be fed back.

Specifically, for different CSI-RS-configNZPID configuration feedback modes in a same CSI process, the UE is instructed to feed back only W1 for the CSI-RS resource ID. The first network device may add signaling "W1-feedback-List-r14 SEQUENCE(SIZE (1 . . . 7)) OF ENUMERATED {true, false} OPTIONAL—Need OR" to RRC signaling, to indicate whether codebook-restricted feedback is to be performed, or indicate codebook identifiers whose measurement results need to be fed back. Alternatively, for a beamformed CSI-RS, a TP may configure a rank-restricted CSI measurement instruction for each NZP CSI-RS resource ID.

SIZE (1 . . . 7) in W1-feedbackList-r14 SEQUENCE (SIZE (1 . . . 7)) OF ENUMERATED {true, false} indicates a configured size of the field. For example, a maximum value is 7. A value of the field may be consistent with, in other words, in a one-to-one correspondence with a size of CSI-RS-ConfigNZPIDList-r14, or less than a size of CSI-RS-ConfigNZPIDList-r14. For example, a resource indicated by a first ID may be a resource of a serving cell by default, and in this case, the measurement for feeding back only W1 is not used. Therefore, the size of the field of W1-feedbackList-r14 is less than the size of the field of CSI-RS-ConfigNZPIDList-r14. When true is indicated, it indicates that the measurement for feeding back only W1 is to be used, and when false is indicated, it indicates that the measurement for feeding back only W1 is not to be used.

After receiving the instruction for instructing to feed back only W1, the UE may perform measurement and feedback for feeding back only W1 for a specific NZP CSI-RS ID resource/some specific NZP CSI-RS ID resources in the CSI process. In this case, UE complexity can be reduced, and further the UE can measure and feed back one beam domain aligned with the UE. Therefore, when coordination is performed between TPs, a coordinated point can be enabled to avoid only the beam domain, to reduce complexity.

(3) The codebook feedback restriction instruction is configured for a CSI-IM resource ID, the CSI-IM resource ID is corresponding to the codebook identifier that is to be fed back, and the quantity of codebook identifiers that are to be fed back is less than the quantity of all codebook identifiers.

That the CSI-IM resource ID is corresponding to the codebook identifier that is to be fed back means that the codebook feedback restriction instruction is used to instruct the second network device to feed back the measurement result of the codebook identifier indicated in the codebook feedback restriction instruction, and the second network device can determine, based on the CSI-IM resource ID, a codebook identifier/codebook identifiers whose measurement result/measurement results needs/need to be fed back.

Specifically, for different CSI-IM-configID configuration feedback modes in a same CSI process, the UE is instructed to feed back only W1 for an NZP CSI-IM resource in the CSI-IM resource ID.

The first network device may add, to RRC signaling, a corresponding indication, for example:

"W1-feedbackList-r14 SEQUENCE(SIZE (1 . . . 7)) OF ENUMERATED {true, false} OPTIONAL—Need OR"

SIZE (1 . . . 7) in W1-feedbackList-r14 SEQUENCE (SIZE (1 . . . 7)) OF ENUMERATED {true, false} indicates a configured size of the field. For example, a maximum value is 7. A value of the field may be consistent with, in other words, in a one-to-one correspondence with a size of CSI-RS-ConfigNZPIDList-r14, or less than a size of CSI-RS-ConfigNZPIDList-r14. For example, a resource indicated by a first ID may be a resource of a serving cell by default, and in this case, the measurement for feeding back only W1 is not used. Therefore, the size of the field of W1-feedbackList-r14 is less than the size of the field of CSI-RS-ConfigNZPIDList-r14. When true is indicated, it indicates that the measurement for feeding back only W1 is to be used, and when false is indicated, it indicates that the measurement for feeding back only W1 is not to be used.

After receiving the instruction for instructing to feed back only W1, the UE may perform measurement and feedback for feeding back only W1 for a specific CSI-IM ID resource or some specific CSI-IM ID resources in the CSI-IM in the CSI process. In this case, UE complexity can be reduced, and further the UE can measure and feed back one beam domain aligned with the UE. Therefore, when coordination is performed between TPs, a coordinated point can be enabled to avoid only the beam domain, to reduce complexity.

When the UE feeds back a codebook-restricted codebook identifier, the coordinated transmission point may obtain interference beam information of the UE based on the codebook-restricted codebook identifier. When the coordinated point uses precoding to perform transmission, avoidance needs to be considered during coordinated transmission provided that the precoding includes the interference beam information that is of the UE and that is corresponding to the codebook-restricted codebook identifier.

In addition, the rank-restricted CSI measurement solution may be combined with the CSI measurement solution for feeding back only W1. Both the restricted rank measurement instruction and the codebook feedback restriction instruction may be sent, and restricted measurement and feedback performed based on the restricted rank measurement instruction may be performed in parallel with restricted feedback performed based on the codebook feedback restriction instruction.

Restricted CSI measurement in this embodiment of the present application may be a measured restricted target, for example, during rank measurement, only the rank indicated in the restricted CSI measurement instruction is measured; or may be restricted feedback, for example, during codebook measurement, only the measurement result of the codebook identifier indicated in the codebook feedback restriction instruction is fed back.

Figure 5:
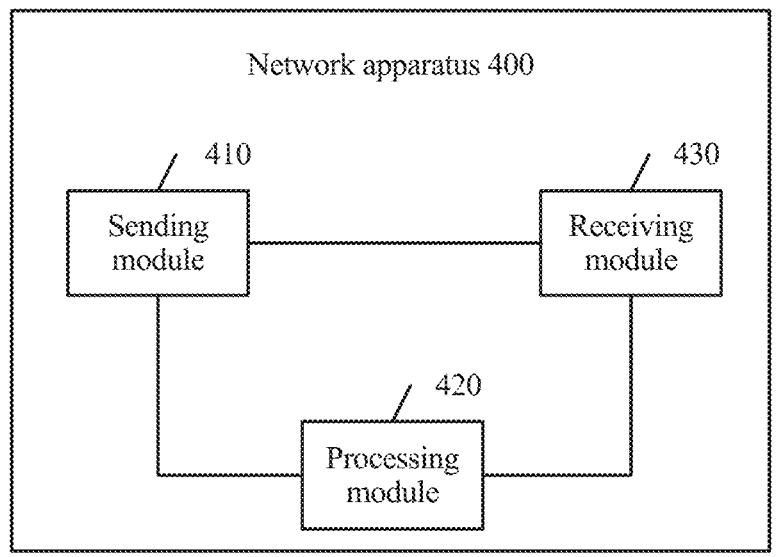
FIG. 5 is a schematic block diagram of a network device according to an embodiment of the present application.

FIG. 5 shows a network device 400 according to an embodiment of the present application. The apparatus 400 includes:

a sending module 410, where the sending module is configured to send a restricted channel state information CSI measurement instruction to user equipment, and the restricted CSI measurement instruction is used to instruct the second network device to perform restricted CSI measurement;

a processing module 420, configured to instruct the sending module to send the restricted CSI measurement instruction; and a receiving module 430, where the receiving module is configured to receive CSI sent by the user equipment, and the CSI is generated after the CSI measurement is completed based on the CSI measurement instruction.

The network device 400 according to this embodiment of the present application may be corresponding to the first network device in the measurement method according to the embodiments of the present application, and the foregoing and other operations and/or functions of the modules in the network device 400 are respectively used to implement corresponding procedures of the methods in FIG. 1 to FIG. 3. For brevity, details are not described herein again.

Figure 6:
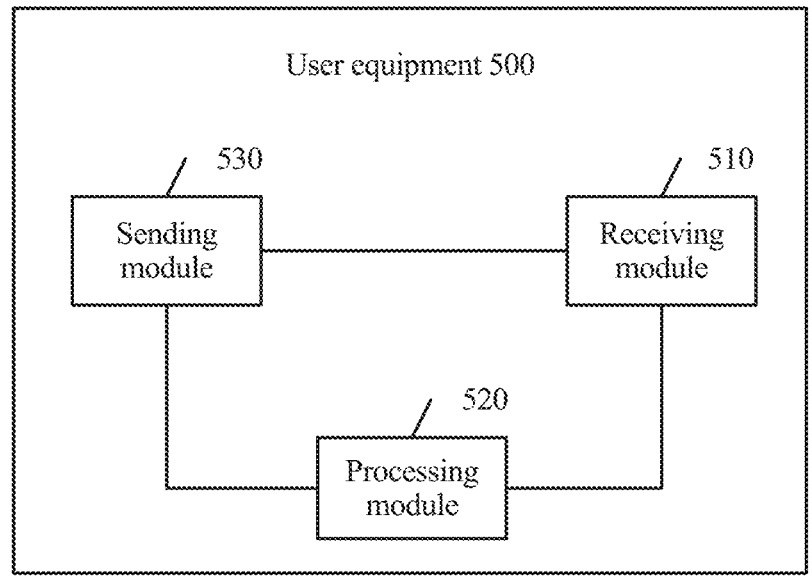
FIG. 6 is a schematic block diagram of user equipment according to an embodiment of the present application.

FIG. 6 shows user equipment 500 according to an embodiment of the present application. The apparatus 500 includes:

a receiving module 510, where the receiving module is configured to receive a restricted CSI measurement instruction sent by a network device, and the restricted CSI measurement instruction is used to instruct the user equipment to perform restricted CSI measurement;

a processing module 520, configured to perform restricted CSI measurement based on the restricted CSI measurement instruction; and a sending module 530, configured to send CSI to the network device, where the CSI is generated after the user equipment completes the CSI measurement based on the CSI measurement instruction.

The user equipment 500 according to this embodiment of the present application may be corresponding to the second network device in the measurement method according to the embodiments of the present application, and the foregoing and other operations and/or functions of the modules in the user equipment 500 are respectively used to implement corresponding procedures of the methods in FIG. 1 to FIG. 3. For brevity, details are not described herein again.

Figure 7:
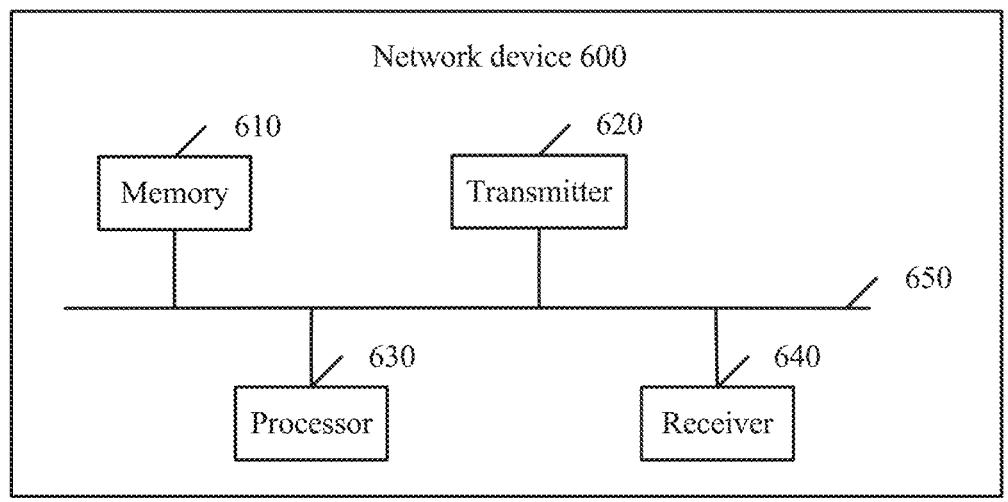
FIG. 7 is a schematic block diagram of another network device according to an embodiment of the present application.

FIG. 7 shows a network device 600 according to an embodiment of the present application. The apparatus 600 includes a memory 610, a transmitter 620, a processor 630, and a receiver 640. The memory 610, the transmitter 620, the processor 630, and the receiver 640 may be connected by using a bus 650, and the memory stores a group of program code.

The transmitter 620, the processor 630, and the receiver 640 are configured to invoke the program code stored in the memory 610 to perform the following operations:

The transmitter 620 is configured to send a restricted channel state information CSI measurement instruction to user equipment, and the restricted CSI measurement instruction is used to instruct the second network device to perform restricted CSI measurement.

The processor 630 is configured to instruct the transmitter to send the restricted CSI measurement instruction.

The receiver 640 is configured to receive CSI sent by the user equipment, and the CSI is generated after the CSI measurement is completed based on the CSI measurement instruction.

The network device 600 according to this embodiment of the present application may be corresponding to the first network device in the measurement method according to the embodiments of the present application, and the foregoing and other operations and/or functions of the modules in the network device 600 are respectively used to implement corresponding procedures of the methods in FIG. 1 to FIG. 3. For brevity, details are not described herein again.

Figure 8:
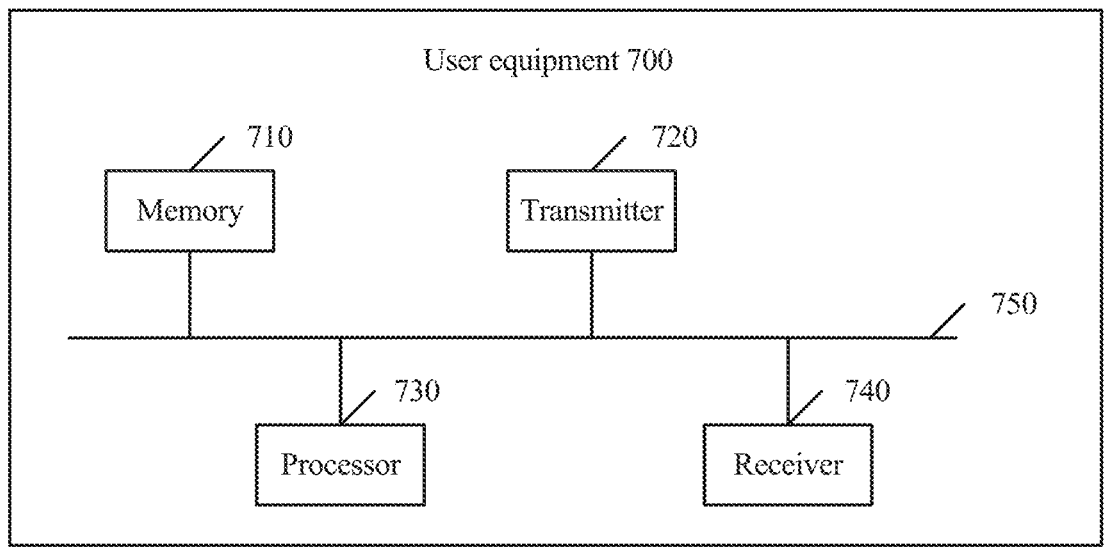
FIG. 8 is a schematic block diagram of an apparatus of another user equipment according to an embodiment of the present application.

FIG. 8 shows another user equipment 700 according to an embodiment of the present application. The user equipment 700 includes a memory 710, a transmitter 720, a processor 730, and a receiver 740. The memory 710, the transmitter 720, the processor 730, and the receiver 740 may be connected by using a bus 750, and the memory stores a group of program code.

The receiver 740 is configured to receive a restricted CSI measurement instruction sent by a network device, where the restricted CSI measurement instruction is used to instruct the user equipment to perform restricted CSI measurement.

The processor 730 is configured to perform restricted CSI measurement based on the restricted CSI measurement instruction.

The transmitter 720 is configured to send CSI to the network device, where the CSI is generated after the user equipment completes the CSI measurement based on the CSI measurement instruction.

The user equipment 700 according to this embodiment of the present application may be corresponding to the second network device in the measurement method according to the embodiments of the present application, and the foregoing and other operations and/or functions of the modules in the user equipment 700 are respectively used to implement corresponding procedures of the methods in FIG. 1 to FIG. 3. For brevity, details are not described herein again.

It should be understood that in the embodiments of the present application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

Optionally, the foregoing apparatus may further include a memory. The memory may include a read-only memory and a random access memory, and provides an instruction and data for the processor. A part of the memory may further include a nonvolatile random access memory. For example, the memory may further store device type information.

In an implementation process, the steps in the foregoing methods can be implemented by using an integrated logic circuit of hardware in the processor, or by using instructions in a form of software. The steps of the method disclosed with reference to the embodiments of the present application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads instructions in the memory and completes the steps in the foregoing methods in combination with hardware in the processor. To avoid repetition, details are not described herein again.

In addition, an embodiment of the present application further provides a communications system, including a network device to which the first cell belongs and a network device to which the second cell belongs in the foregoing embodiments, or including the first transmission point and the second transmission point in the foregoing embodiments.

It should be understood that in the embodiments of the present application, the terms "first" and "second" are merely intended for ease of description and understanding, and shall not constitute any limitation on the embodiments of the present application. The terms "first X" and "second X" may be corresponding to same or different Xs, unless it is clearly specified in this specification or it can be clearly learned from the context. For example, a first network device and a second network device may be same or different network devices, a first cell and a second cell may be same or different cells, and first data and the second data may be same or different data.

It should further be understood that description of each embodiment in this specification focuses on a difference from other embodiments, and for same or similar parts that are not mentioned, reference may be made to each other. For example, for description of a method embodiment or each apparatus embodiment on a user equipment side, refer to description of a method embodiment on a network device side.

It should further be understood that, in the embodiments of the present application, the network device may be a network-side device, or user equipment during D2D communication or M2M communication. In the foregoing embodiments, an example in which the network device is specifically the network-side device is used for description, but the embodiments of the present application are not limited thereto.

It should be understood that, the term "and/or" in the embodiments of the present application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

A person of ordinary skill in the art may be aware that, method steps and units described with reference to the embodiments disclosed in this specification can be implemented by electronic hardware, computer software, or a combination thereof. To clearly describe the interchangeability between hardware and software, the foregoing descriptions have generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of the present application.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, in other words, may be located in one place, or may be distributed on a plurality of network units. Some or all of the units may be selected based on actual requirements to achieve the objectives of the solutions in the embodiments of the present application.

In addition, the functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the present application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Various equivalent modifications or replacements readily figured out by a person skilled in the art within the technical scope disclosed in the present application shall fall within the protection scope of the present application. Therefore, the protection scope of the present application shall be subject to the protection scope of the claims.

What is claimed is:

1. A measurement method comprising:
    sending, by a first network device, a restricted channel state information (CSI) measurement instruction to a second network device,
        wherein the restricted CSI measurement instruction is used to instruct the second network device to perform restricted CSI measurement,
        wherein the restricted CSI measurement instruction comprises an instruction for measuring a restricted rank among a quantity of restricted ranks that is less than a quantity of all ranks, and
        wherein the restricted rank measurement instruction is configured for a channel state information-reference signal (CSI-RS) resource identifier (ID) or a channel state information-interference measurement (CSI-IM) resource ID, and each of the CSI-RS resource ID and the CSI-IM resource ID is associated with a to-be-measured restricted rank; and
    receiving, by the first network device, CSI sent by the second network device without feeding back all measurement results,
        wherein the CSI is generated after the restricted CSI measurement is completed based on the restricted CSI measurement instruction.

2. A measurement method comprising:
    receiving, by a second network device, a restricted channel state information (CSI) measurement instruction sent by a first network device, wherein the restricted CSI measurement instruction is used to instruct the second network device to perform restricted CSI measurement,
wherein the restricted CSI measurement instruction comprises an instruction for measuring a restricted rank among a quantity of restricted ranks that is less than a quantity of all ranks, and
wherein the restricted rank measurement instruction is configured for a channel state information-reference signal (CSI-RS) resource identifier (ID) or a channel state information-interference measurement (CSI-IM) resource ID, and each of the CSI-RS resource ID and the CSI-IM resource ID is associated with a to-be-measured restricted rank;
performing, by the second network device, the restricted CSI measurement based on the restricted CSI measurement instruction; and
sending, by the second network device, CSI to the first network device without feeding back all measurement results from the second network device to the first network device,
wherein the CSI is generated after the second network device completes the restricted CSI measurement based on the restricted CSI measurement instruction.

3. A network device comprising a transmitter, receiver and processor that cooperates with the transmitter and receiver, wherein:
the transmitter cooperates with the processor to send a restricted channel state information (CSI) measurement instruction to user apparatus for instructing the user apparatus to perform restricted CSI measurement,
wherein the restricted CSI measurement instruction comprises an instruction for measuring a restricted rank among a quantity of restricted ranks that is less than a quantity of all ranks, and
wherein the restricted rank measurement instruction is configured for a channel state information-reference signal (CSI-RS) resource identifier (ID) or a channel state information-interference measurement (CSI-IM) resource ID, and each of the CSI-RS resource ID and the CSI-IM resource ID is associated with a to-be-measured restricted rank;
the processor is configured to instruct the transmitter to send the restricted CSI measurement instruction; and
the receiver cooperates with the processor to receive CSI sent by the user apparatus without feeding back all of the measurement results, and the CSI is generated after the restricted CSI measurement is completed based on the restricted CSI measurement instruction.

4. User apparatus comprising a transmitter, receiver and processor that cooperates with the transmitter and receiver, wherein:
the receiver cooperating with the processor to receive a restricted channel state information (CSI) measurement instruction sent by a network device, and
wherein the restricted CSI measurement instruction instructs the user apparatus to perform restricted CSI measurement,
wherein the restricted CSI measurement instruction includes instructions for measuring a restricted rank among a quantity of restricted ranks that is less than a quantity of all ranks, and
wherein the restricted rank measurement instruction is configured for a channel state information-reference signal (CSI-RS) resource identifier (ID) or a channel state information-interference measurement (CSI-IM) resource ID, and each of the CSI-RS resource ID and the CSI-IM resource ID is associated with a to-be-measured restricted rank;
the processor configured to perform the restricted CSI measurement based on the restricted CSI measurement instruction; and
the transmitter cooperating with the processor to send CSI to the network device without feeding back all measurement results,
wherein the CSI is generated after the user apparatus completes the restricted CSI measurement based on the restricted CSI measurement instruction.

* * * * *